US011224817B1

(12) United States Patent
Romero, Jr. et al.

(10) Patent No.: US 11,224,817 B1
(45) Date of Patent: Jan. 18, 2022

(54) VIDEO GAME SYSTEM FOR SAVING

(71) Applicant: UIPCO, LLC, San Antonio, TX (US)

(72) Inventors: Jose L. Romero, Jr., San Antonio, TX (US); Reynaldo Medina, III, San Antonio, TX (US); Andre Rene Buentello, San Antonio, TX (US); Noe Alberto Martinez, San Antonio, TX (US); Cayley Danielle Collum, San Antonio, TX (US); Emily Kathleen Krebs, San Antonio, TX (US); Christopher Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/798,063

(22) Filed: Feb. 21, 2020

Related U.S. Application Data

(60) Provisional application No. 62/809,105, filed on Feb. 22, 2019.

(51) Int. Cl.
*A63F 13/792* (2014.01)
*A63F 13/49* (2014.01)
*G06Q 20/12* (2012.01)

(52) U.S. Cl.
CPC ............ *A63F 13/792* (2014.09); *A63F 13/49* (2014.09); *G06Q 20/123* (2013.01)

(58) Field of Classification Search
CPC ...... A63F 13/792; A63F 13/49; G06Q 20/123
See application file for complete search history.

(56) References Cited

U.S. PATENT DOCUMENTS

| | | | |
|---|---|---|---|
| 8,079,044 B1* | 12/2011 | Craner | H04N 21/4542 725/28 |
| 10,022,632 B1* | 7/2018 | McAdoo | G06Q 30/06 |
| 10,621,653 B2* | 4/2020 | Isaacson | G06Q 20/40 |
| 2006/0218651 A1* | 9/2006 | Ginter | H04N 21/2543 726/27 |
| 2017/0186008 A1* | 6/2017 | Pachouri | G06Q 20/3278 |
| 2018/0089940 A1* | 3/2018 | Petersen | G07F 17/3258 |
| 2019/0138979 A1* | 5/2019 | Forgatch | G06Q 30/0643 |
| 2020/0202354 A1* | 6/2020 | Senn | G06Q 20/29 |

OTHER PUBLICATIONS

Anthony Bouchard. 'Ask to Buy' lets you control what your kids buy in iTunes, iBooks, or App Store. https://www.idownloadblog.com/2016/03/10/ask-to-buy/. Created Mar. 10, 2016. (Year: 2016).*

* cited by examiner

*Primary Examiner* — Reginald A Renwick
(74) *Attorney, Agent, or Firm* — Perkins Coie LLP

(57) ABSTRACT

Embodiments described herein disclose technology for allocating funds related to one or more in-game purchases when users interact with a gaming application. Based on the interactions of a user with the gaming application running on a client device of the user, a gaming server receives information of an in-game purchase by the user. The gaming server notifies a second computer server of the in-game purchase which sends an activation link to the user. When the second computer detects selection of the activation link, funds are electronically transferred from the gaming application to one or more accounts. In some embodiments, the funds allocated to the one or more accounts can be a percentage of the in-game purchase amount.

17 Claims, 5 Drawing Sheets

VIDEO GAME SYSTEM FOR SAVING

CROSS-REFERENCE TO RELATED APPLICATIONS

This application is a non-provisional of and claims priority to U.S. Provisional Application No. 62/809,105, filed on Feb. 22, 2019, entitled "VIDEO GAME SYSTEM FOR SAVING," which is hereby incorporated by reference in its entirety for all purposes.

BACKGROUND

Many people like playing electronic games as a pastime, for entertainment, or for earning a living. Electronic games employing computer technology can be played by a single player (e.g., with a gaming server or a mobile application) or as a multi-player game with other players. In some instances, an electronic game can be played for training or development. For example, electronic games can be played with an aim to improve the reading skills of children with dyslexia or as simulation games for training military personnel, airplane pilots, and astronauts.

Many electronic games allow players to make in-game purchases while playing. For example, a person can purchase a game component such as game characters, special powers, weapons, avatars, game content, live-saving supplies, or cheat codes while playing the game. The person playing the game pays the owner (or, entity) offering or hosting the electronic game for an in-game purchase of a gaming component.

Figure 1:
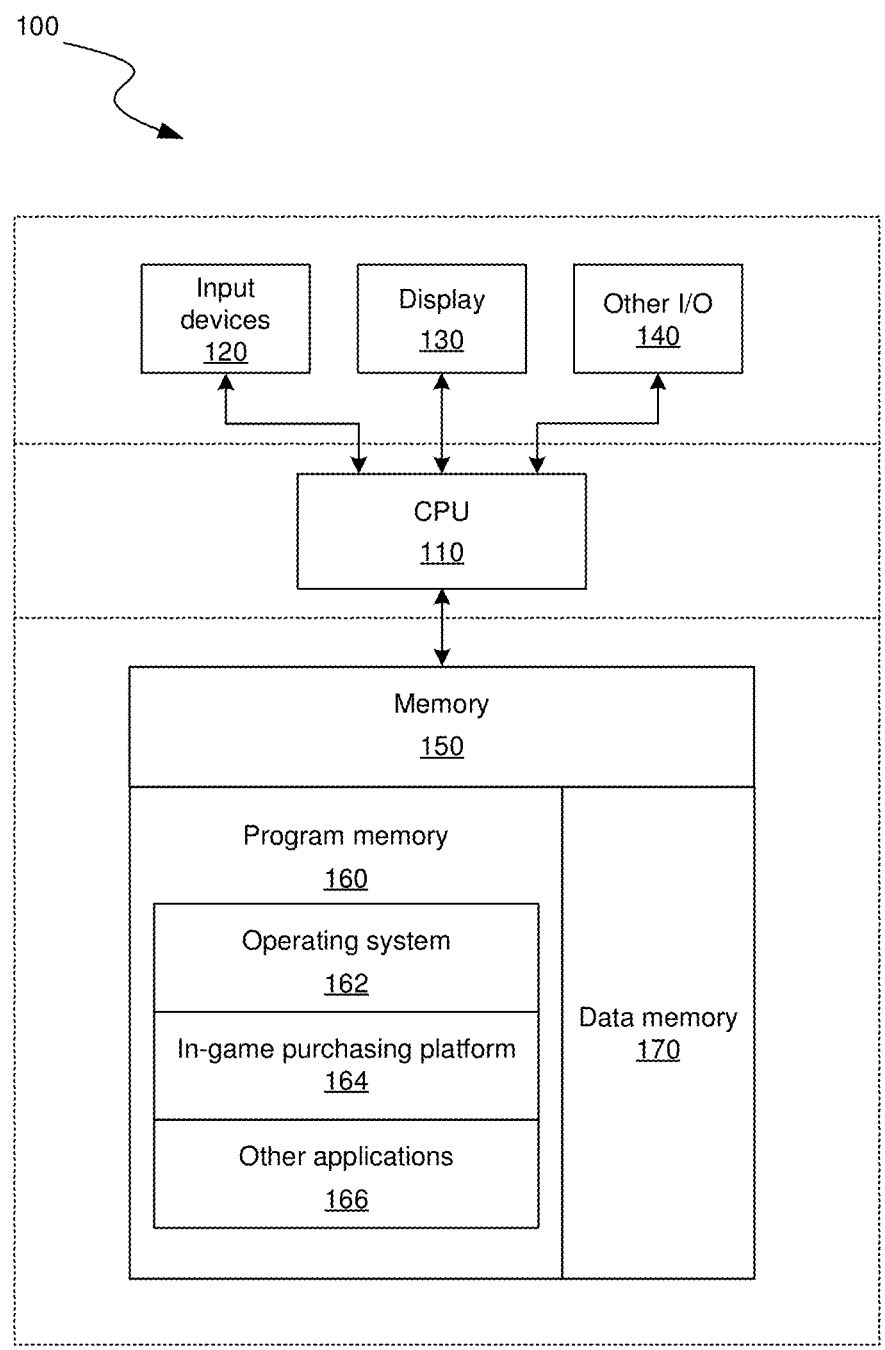
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

When a player of an electronic game makes an in-game purchase of a game component (e.g., game characters, skins, armory items, special powers, weapons, avatars, game content, live-saving supplies, cheat codes, and the like) while playing the game, typically the funds for the in-game purchase are acquired or taken by the company offering or owing the game. The person making the in-game purchase does not usually retain any proceeds from the in-game purchase. If the person deletes the game, changes gaming devices, or generally stops playing games, the funds paid for in-game purchases are lost forever and are not returned back the person. That is, in prior systems, the entity offering the game generally does nothing to pay back a person playing an electronic game for making an in-game purchase.

Moreover, when players use more than one device when interacting with the game, device management can be challenging. Companies generally use device attributes to identify the device and install a token on the device to recognize the device. Thus, in-game purchases made on one user device may not be transferrable to other user devices. As a result, users are left with no choice but to buy gaming components separately for each device. Even with multiple in-game purchases by a user, the entity offering the game generally does nothing to pay back the person for making multiple in-game purchases.

To address the above-mentioned issues, the technology described herein provides a system and method for allocating funds related to in-game purchases when users interact with a gaming application. The funds can be allocated to one or more accounts. The one or more accounts can belong to a user, a family member of the user, a co-player of the user, or a payee authorized by the user. In some embodiments, the funds allocated to the one or more accounts can be a percentage of the in-game purchase value. For example, a user can choose to allocate 3% of $10 spent on the user's Ironman avatar to the user's checking account. The gaming application can span a wide range of computer-implemented client-facing platforms such as arcade systems, home consoles, handheld consoles, dedicated gaming computers, general-purpose computers, mobile phones, tablet computers, virtual reality devices, augmented reality devices, or wearable electronic devices. Based on the interactions of a user with the gaming application running on a client device of the user, a gaming server (typically located remotely from the client device) can receive information of an in-game purchase by the user. Accordingly, the gaming server notifies (in real time or near real time) a second computer server of the in-game purchase. The second computer server can be associated with a bank, a financial institution, an insurance company, or other entity. The second computer server can be electronically coupled to a second application running on the client device. As such, the second application and the second server can monitor electronic communications with each other, in addition to communications between and/or involving the gaming application and the gaming server.

After receiving a notification of an in-game purchase associated with a gaming application, the second computer server can send an activation link indicating an amount of the in-game purchase to the second application running on the client device of the user. In some embodiments, selection of the activation link by the user allows an allocation of funds from the gaming application to one or more accounts. In some embodiments, the disclosed technology provides increased security for in-game purchases. For example, the second application can send (in real time or near real time) the second computer server a unique identifier associated with a timestamp of the in-game purchase and information identifying the client device of the user, when the user selects the activation link.

Thus, in accordance with the disclosed technology, when the second computer detects selection of the activation link, funds can be electronically transferred from the gaming application to one or more accounts. In some embodiments, the gaming application can allow users to hold or maintain balances on their accounts (e.g., at the gaming server) that can be used towards in-game purchases. In some embodiments, the gaming application contacts (in real time or near real time) the user's credit card company or bank which facilitates the transfer of funds into the account(s). In some embodiments, the entity owning or controlling the second computer server has a contractual agreement with the entity hosting the gaming server. In some embodiments, the user's credit card company or bank can be the same entity that owns and operates the second computer server. In multiple use cases, at least one benefit of the disclosed technology is facilitating the seamless allocation of funds, corresponding to (at least) a portion of the user's in-game purchase amount, into one or more financial accounts. For example, if a user pays $5 for an in-game purchase of a sword in a fighting game, at least a portion of the $5 is allocated to one or more accounts. This enhances a user's savings and financial stability while allowing the user to participate in an enjoyable pastime (i.e., playing a video game). There is no limit on the type of account to which the funds are allocated. For example, the one or more accounts can be a checking account, a savings account, an investment account, a brokerage account, a trading account, an entity to whom the user owes money (e.g., electric company) or other financial instrument or bill pay accounts. An account can also be associated/affiliated/maintained with a third party such as another company or organization.

In some embodiments, a randomly selected percentage of the in-game purchase amount is applied to an account. In other embodiments, the allocations can be customized by the user. For example, in accordance with disclosed embodiments, a user can choose to allocate 10% of an in-game purchase amount to a checking account, 7% to an online charity, and 2% to a family member's account. This allocation is for illustration only. Various other customizations are feasible. A user can input or select an account to direct the funds to in one or more ways. For example, the user can enter allocation-related details at the activation link; or the user can enter the details via the gaming application, the second application, or other suitable system. In some embodiments, an allocation of funds occurs whenever the user makes an in-game purchase. That is, an allocation happens for each purchase by the user. In other embodiments, an allocation is triggered as a result of multiple in-game purchases. For example, when the system determines that the user has made a certain minimum number of in-game purchases, an allocation of funds is triggered. In yet other embodiments, when the system determines that the user has reached a certain threshold monetary value for in-game purchase(s), an allocation is triggered.

This disclosure describes systems and processes designed to allocate funds for in-game purchases associated with a gaming application. Various embodiments may provide one or more of the following technological improvements: (1) an effective use of various computing techniques during the game to obtain information from and provide information to users; (2) interoperability between various servers and applications running on client devices; (3) a seamless enhancement of financial security of users while the user partakes in a game; and (4) authentication for in-game purchases.

As used herein, the terms "second server" and "remote computer server" can be generally synonymous, depending on the context of usage. Also, the terms "second application" and "mobile device" application can be generally synonymous. However, the four aforementioned components can be distinguished from a "gaming server" and a "gaming application." In the following description, for the purposes of explanation, numerous specific details are set forth in order to provide a thorough understanding of embodiments of the present technology. It will be apparent, however, that embodiments of the present technology may be practiced without some of these specific details.

Suitable System

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that facilitate allocation of funds for in-game purchases. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, an augmented reality device, a virtual reality device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, in-game purchasing platform 164, and other application programs 166. A memory 150 can also include data memory 170 that can include user identifying information (e.g., addresses, usernames, passwords, personal identification numbers), account information, allocation preferences, historical information regarding use of an instance of an application, web browsing history, and other information which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
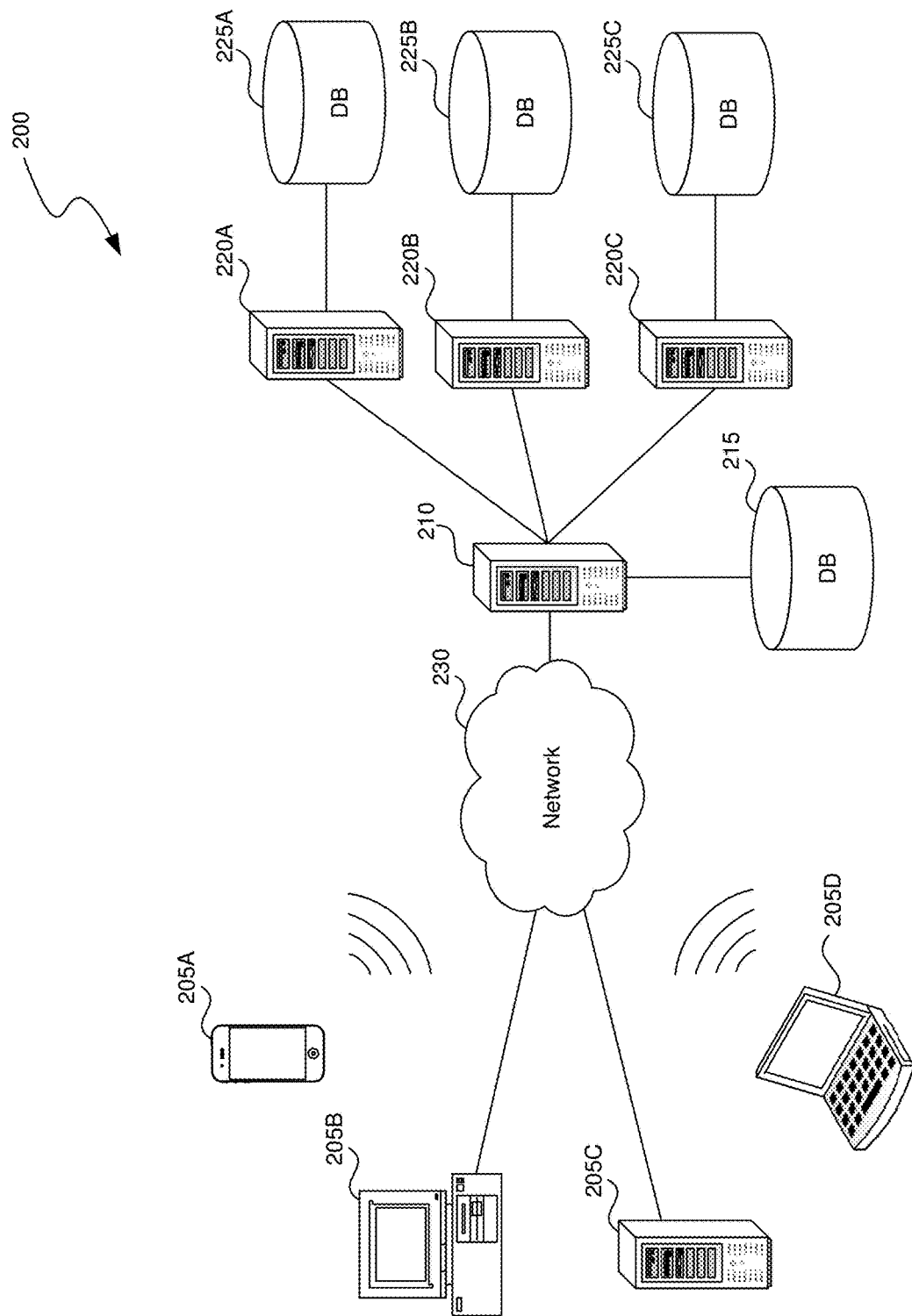
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client (user) devices 205A-D, examples of which can include device 100. Client devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as user account information, a record of their in-game purchases, and respective allocations of funds associated with the in-game purchases. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
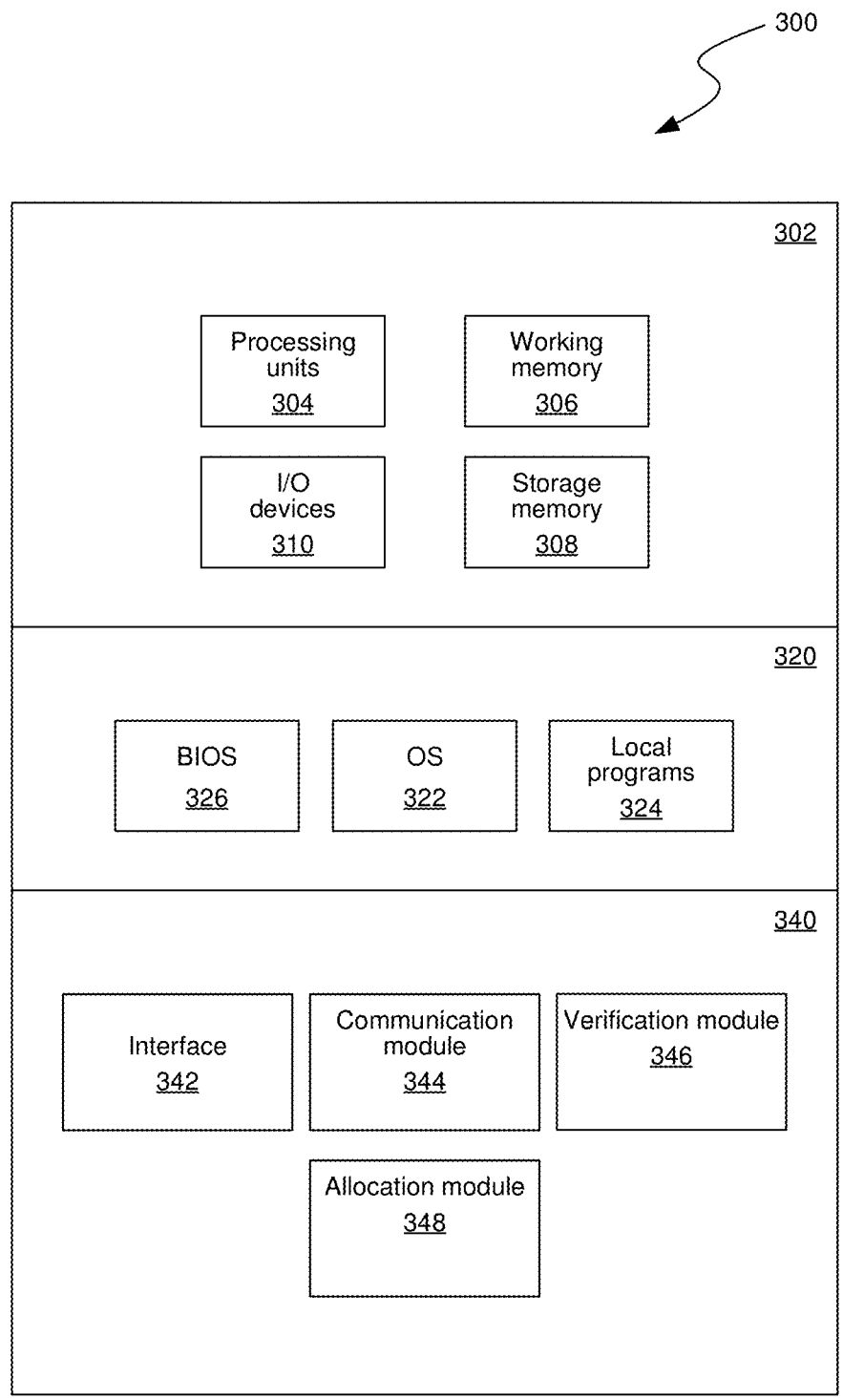
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include communication module 344, verification module 346, allocation module 348, and components that can be used for transferring data and controlling the specialized components, such as interface 342. In some implementations, components 300 can be in a computing system that is distributed across multiple computing devices or can be an interface to a server-based application executing one or more of specialized components 340.

Communication module 344 facilitates communication between system 300 and external components such as client (user) devices and/or other servers (e.g., gaming server) via wireless communication methods such as cellular communication, near field communication (NFC), infrared (IR), Bluetooth, and Wi-Fi. In some embodiments, communication module 344 can receive notifications (e.g., an amount of the user's in-game purchase, information identifying the device used in the in-game purchase, and a timestamp of the in-game purchase) from a gaming server related to in-game purchases by users. These notifications can be in real time or near real time of the actual in-game purchase. In other embodiments, the notifications can be provided in a batch process periodically. Communication module 344 can also track actions of a user. For example, communication module 344 can detect if the user has clicked on a clickable link (e.g., the activation link) or has received information indicating how the user desires his or her allocations. For example, the user can choose a percentage or a number for the allocation(s) and associated accounts where the allocations are to be made. In some embodiments, communication module 344 can receive verification information (e.g., an authentication code) from the user after querying the user for the authentication code. Communication module 344 can also send a message to the user indicating that the authentication code sent by him or her is valid (or invalid), upon verification by verification module 346.

Verification module 346 verifies that the authentication code received from the user by communication module 344 is valid, in applicable circumstances (i.e., verification is not always required). The validity can be determined by matching the authentication code from the user with a second code sent by the gaming server. Thus, for purposes of authentication, the gaming server can send (following an in-game purchase) the same authentication code to verification module 346 and the user. When a bona fide user sends his or her authentication code, that authentication code is matched against the one received from the gaming server. In some embodiments, the authentication code can be a unique identifier associated with a timestamp of the in-game purchase and information identifying the mobile device of the user.

Allocation module 348 receives information passed by communications module 344 indicating how the user desires to allocate funds (or a portion of the funds) for the in-game purchase. For example, the user can choose a percentage or a number for the allocation(s) and associated accounts where the allocations are to be made. Allocation module 348 can accordingly allocate the funds from the gaming application as requested by the user.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
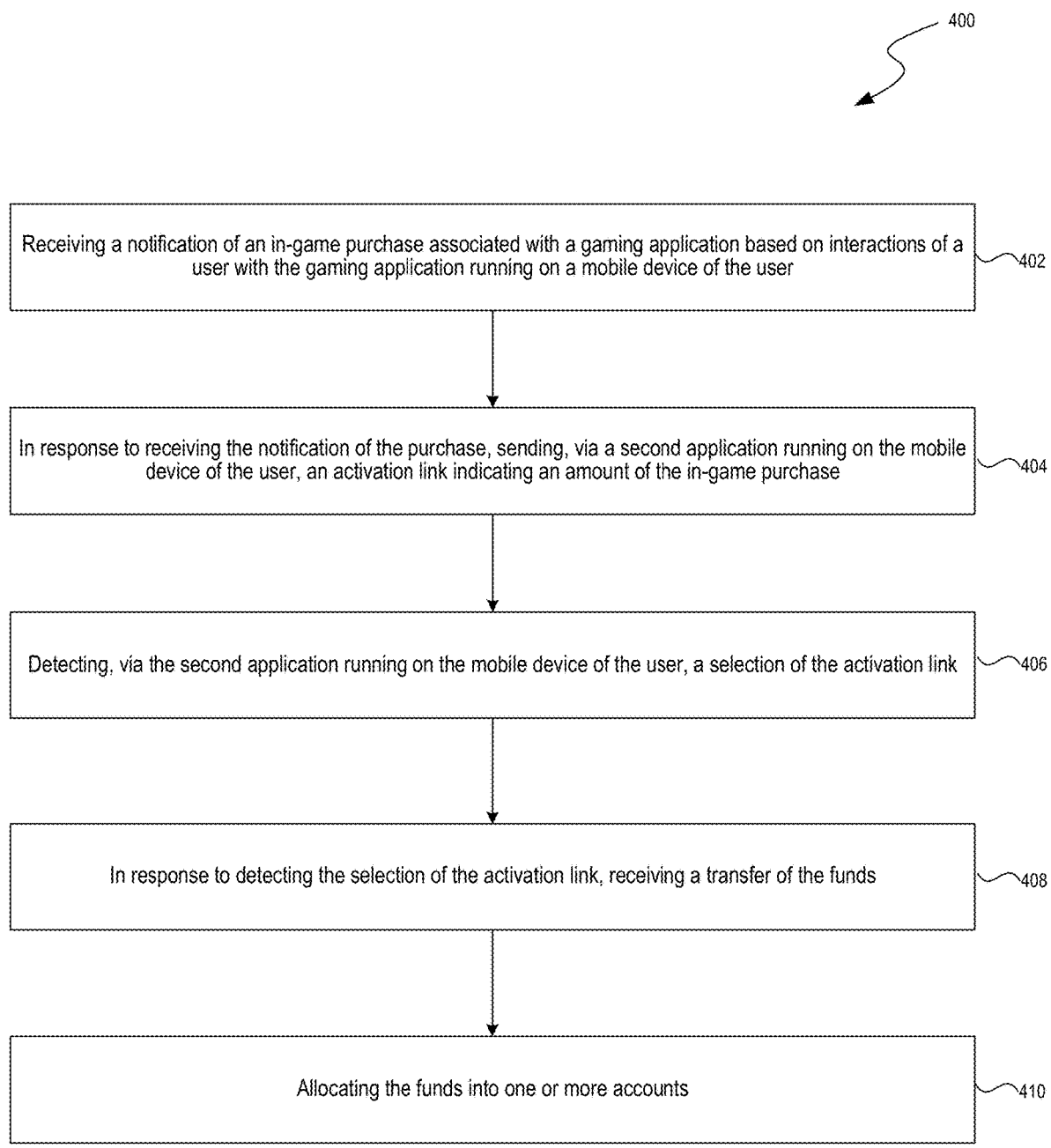
FIG. 4 is a flow diagram illustrating a process for allocating in-game purchases from the perspective of a server.

FIG. 4 is a flow diagram illustrating a process 400 for allocating one or more in-game purchases from the perspective of a server. Receiving operation 402 receives a notification of an in-game purchase associated with a gaming application based on interactions of a user with the gaming application running on a mobile device of the user. The notification can be received from a gaming server communicatively coupled to the gaming application. For example, based on a user's purchase of a sword in a fighting gaming application, the gaming server coupled to the fighting gaming application can receive a notification of the in-game purchase and in turn notify the server. In response to receiving the notification, sending operation 404 can send an activation link via a second application running on the user's device indicating an amount of the in-game purchase. The second application and the server in this process are communicatively coupled to one another. In some embodiments, the server sends the activation link to the gaming server to notify the user via the gaming application.

After receiving the activation link via the second application, the user may select the activation link allowing an allocation of funds from the gaming application to one or more accounts. For example, the one or more accounts can be a checking account, a savings account, an investment account, a brokerage account, a trading account, a bill pay account, or any other account associated with the user, the user's family member, the user's friend, or a payee authorized by the user such as a company, retail store, entity, or organization. In some embodiments, the allocations can be customized by the user. For example, a user is given the ability to choose to allocate 20% of the in-game purchase amount to one of his own accounts. As a result of the selection by the user, detecting operation 406 detects the selection of the activation link. In response to detecting the selection of the activation link, receiving operation 408 receives a transfer of funds from the gaming application, the user's bank or financial institution, a credit card company, or a third party lender. For example, the gaming application can have a menu option or button indicating "Allocate funds." By clicking on the menu or the button, the user can specify details of the allocation, e.g., what percentages or portions to allocate, which accounts, and other details of the allocation, or simply that an allocation should occur. In some embodiments, a user can bring a toy or figure with near field communication (NFC) tags close to an electronic gaming device. The electronic gaming device can sense the toy or figure in close proximity and trigger a request for allocation of funds to the gaming server or the second server. In some embodiments, the allocation of funds can be triggered using a user's remote control device associated with the user's gaming device. For example, a button on the remote control device can indicate "Allocate" triggering an allocation request from the user. In some embodiments, users can win money or points from playing a game. The money or points added to the user's account on the gaming server can also trigger the activation link to be sent to the user.

For embodiments with activation links, in response to detecting selection of the activation link, allocating operation 410 allocates the funds to one or more financial accounts. In some embodiments, the user can specify percentage allocations or a money amount of the allocations when selecting the activation link. At least one practical application of the present technology is that users (players) located at different geographical locations can form a group or community (e.g., for a commonly shared cause or interest) and can pool their allocations. For example, a first user can allocate 5% of his in-game purchases, a second user can allocate $2 of his in-game purchases, and a third user can allocate 10% of his in-game purchases. These allocations can be for users playing the same electronic game or different electronic games. It will be understood that example allocations discussed herein are solely for illustrative purposes. In some implementations, there is no limit on the number of users and their respective allocation amounts. In some embodiments, a user can choose to allocate different allocation amounts for different gaming applications. Although the examples herein describe allocations occurring from in-game purchases, it will be understood that those are merely for illustrative purposes. In alternate embodiments, as discussed above, allocations can occur as a result of a user winning in the gaming application. For example, if the user reaches a certain level or milestone in the game, the gaming application may reward the user with cash or points. In such applications, allocations can occur from the rewards (in cash or otherwise) received by a user.

Figure 5:
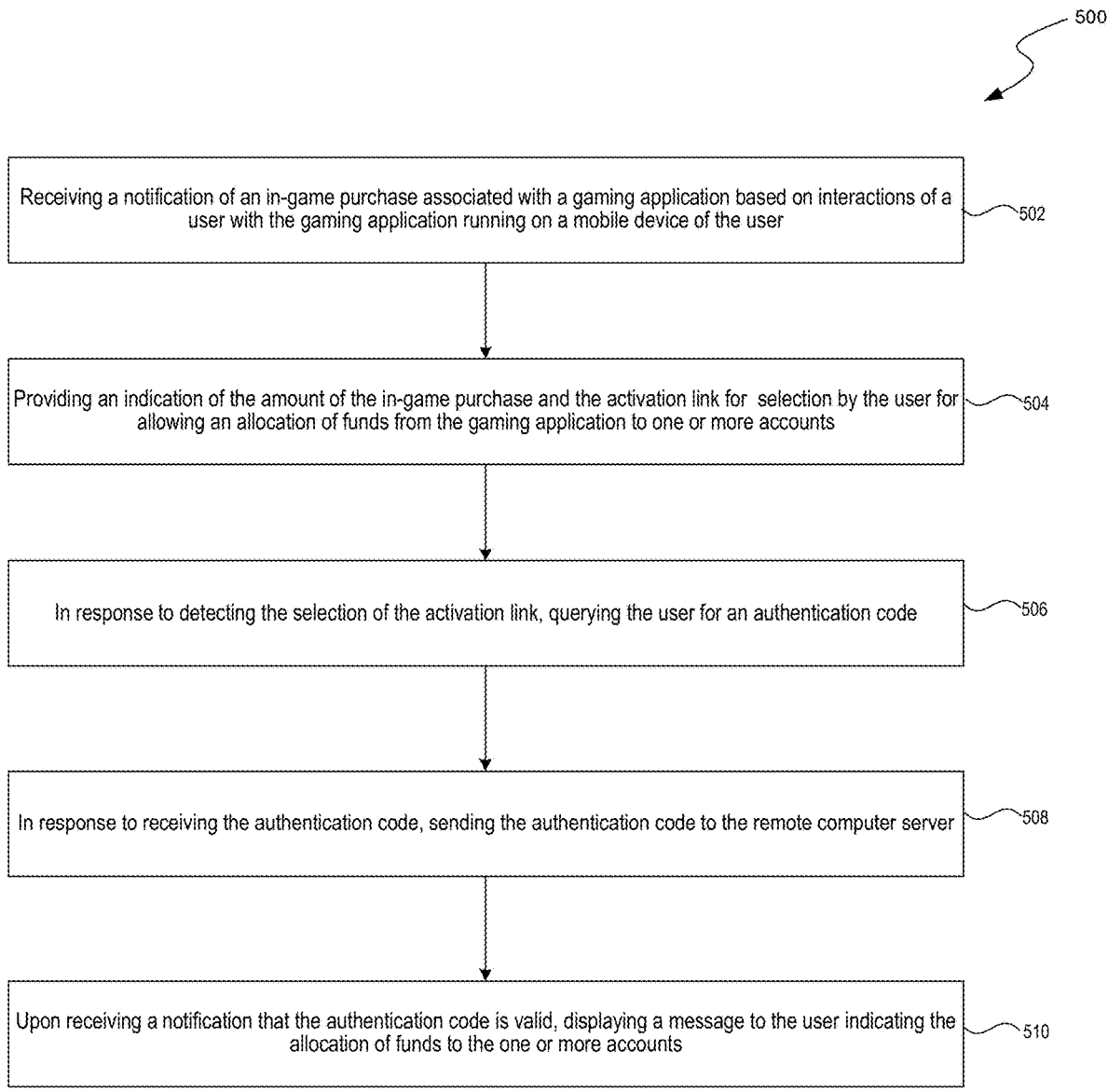
FIG. 5 is a flow diagram illustrating a process for allocating in-game purchases from the perspective of a client device.

FIG. 5 is a flow diagram illustrating a process for allocating in-game purchases from the perspective of a client device on which a gaming application and at least a second application are configured to run. Receiving operation 502, receives (from a remote computer server communicatively coupled to the second application) a notification of an in-game purchase associated with a gaming application running on the mobile device of a user based on interactions of the user with the gaming application. The notification from the second server can include an activation link indicating an amount (or a request to select an amount) of the user's in-game purchase. After receiving the notification, providing operation 504 provides an indication of the amount of the user's in-game purchase and the activation link on a graphical user interface (GUI) of the client device. The user then selects the activation link. In response to detecting selection of the link, querying operation 506 queries the user for an authentication code. For example, the authentication code can be a unique identifier associated with a timestamp of the in-game purchase and information identifying the mobile device of the user. In some embodiments, the unique identifier can be a set of alphanumeric characters, with or without a semantic meaning. In some embodiments, the unique identifier can be in the form of a QR code. In some embodiments, the gaming application can send the authentication code to the user subsequent to the user's in-game purchase. In response to receiving the authentication code (from the user or from the gaming application), sending operation 508 sends the authentication code to the remote computer server. As a result, the remote computer server validates the authentication code from the second application and sends notification of the outcome of validation to the second application. Upon receiving a notification from the remote computer server that the authentication code is valid, displaying operation 510 displays a message to the user indicating the allocation of funds (or, a portion thereof) to one or more accounts. The one or more accounts may include financial accounts related to the user, one or family members of the user, a co-player of the user, or a payee authorized by the user.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. The phrase "real-time" means instantaneously or near instantaneously (i.e., within milliseconds) and "near real-time" means within a few hours. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method implemented at a computer server for allocation of a portion of in-game purchases to one or more other accounts comprising:
   receiving, at the computer server, a notification of an in-game purchase associated with a gaming application coupled to an online communication network based on interactions of a user with the gaming application running on a client device of the user;
   in response to receiving the notification of the in-game purchase, sending, to the client device of the user, an activation link indicating an amount of the in-game purchase, wherein selection of the activation link allows an allocation of funds from the amount of the in-game purchase associated with the gaming application to one or more other accounts;
   in response to receiving an indication from the client device of the user that the activation link was selected:
      receiving a transfer of the funds; and
      receiving, via the client device of the user, a unique identifier associated with a timestamp of the in-game purchase and information identifying the client device of the user; and
   allocating a portion of the amount of the in-game purchase from the funds into the one or more other accounts.

2. The method of claim 1, wherein the notification of the in-game purchase is received at the computer server in real time or near real time with respect to the in-game purchase associated with the gaming application.

3. The method of claim 1, wherein the notification of the in-game purchase is received from a gaming server remotely located from the client device of the user and the computer server.

4. A method implemented at a computer server for allocation of a portion of in-game purchases to one or more other accounts comprising:
   receiving, at the computer server, a notification of an in-game purchase associated with a gaming application coupled to an online communication network based on interactions of a user with the gaming application running on a client device of the user;
   in response to receiving the notification of the in-game purchase, sending, to the client device of the user, an activation link indicating an amount of the in-game purchase, wherein selection of the activation link allows an allocation of funds from the amount of the in-game purchase associated with the gaming application to one or more other accounts;
   in response to receiving an indication from the client device of the user that the activation link was selected, receiving a transfer of the funds; and
   allocating a portion of the amount of the in-game purchase from the funds into the one or more other accounts, wherein the one or more other accounts include financial accounts related to the user, one or more family members of the user, a co-player of the user, or a payee authorized by the user, and wherein the portion of the funds corresponds to a percentage of the amount of the in-game purchase.

5. The method of claim 1, wherein the client device of the user includes an arcade system, a home console, a handheld console, a dedicated gaming computer, a general-purpose computer, a mobile phone, a tablet computer, or a wearable electronic device.

6. The method of claim 1, wherein the interactions of the user with the gaming application occurs during an online session, and wherein the timestamp is sent by a gaming server to the gaming application running on the client device of the user during the online session.

7. A non-transitory computer-readable medium comprising a set of instructions that, when executed by one or more processors, cause a computer server configured for allocation of a portion of in-game purchases to perform the operations of:
   receiving, at the computer server, a notification of an in-game purchase associated with a gaming application coupled to an online communication network based on interactions of a user with the gaming application running on a client device of the user;
   in response to receiving the notification of the in-game purchase, sending to the client device of the user, an activation link indicating an amount of the in-game purchase, wherein selection of the activation link allows an allocation of funds from the amount of the in-game purchase associated with the gaming application to one or more other accounts;
   in response to receiving an indication from the client device of the user that the activation link was selected:
      receiving a transfer of the funds; and
      receiving, via the client device of the user, a unique identifier associated with a timestamp of the in-game purchase and information identifying the client device of the user; and
   allocating a portion of the amount of the in-game purchase from the funds into the one or more other accounts.

8. The non-transitory computer-readable medium of claim 7, wherein the notification of the in-game purchase is received at the computer server in real time or near real time with respect to the in-game purchase associated with the gaming application.

9. The non-transitory computer-readable medium of claim 7, wherein the notification of the in-game purchase is received from a gaming server remotely located from the client device of the user and the computer server.

10. A non-transitory computer-readable medium comprising a set of instructions that, when executed by one or more processors, cause a computer server configured for allocation of a portion of in-game purchases to perform the operations of:
    receiving, at the computer server, a notification of an in-game purchase associated with a gaming application coupled to an online communication network based on interactions of a user with the gaming application running on a client device of the user;
    in response to receiving the notification of the in-game purchase, sending to the client device of the user, an activation link indicating an amount of the in-game purchase, wherein selection of the activation link allows an allocation of funds from the amount of the in-game purchase associated with the gaming application to one or more other accounts;
    in response to receiving an indication from the client device of the user that the activation link was selected, receiving a transfer of the funds; and
    allocating a portion of the amount of the in-game purchase from the funds into the one or more other accounts, wherein the one or more other accounts include financial accounts related to the user, one or more family members of the user, a co-player of the user, or a payee authorized by the user, and wherein the portion of the funds corresponds to a percentage of the amount of the in-game purchase.

11. The non-transitory computer-readable medium of claim 7, wherein the client device of the user includes an arcade system, a home console, a handheld console, a dedicated gaming computer, a general-purpose computer, a mobile phone, a tablet computer, a virtual reality device, an augmented reality device, or a wearable electronic device.

12. The non-transitory computer-readable medium of claim 7, wherein the unique identifier is provided by the gaming application to the user and subsequently entered by the user as part of the selection of the activation link.

13. The non-transitory computer-readable medium of claim 7, wherein the interactions of the user with the gaming application occurs during an online session, and wherein the timestamp is sent by a gaming server to the gaming application running on the client device of the user during the online session.

14. A mobile device for allocating a portion of money spent on in-game purchases, the mobile device comprising:
one or more processors on a mobile device of a user; and
one or more memories storing instructions that, when executed by the one or more processors, cause the mobile device to perform a process comprising:
receiving, from a remote computer server, a notification of an in-game purchase associated with a gaming application running on the mobile device of the user based on input received by the mobile device with the gaming application, wherein the notification includes an activation link indicating an amount of the in-game purchase;
providing, via a graphical user interface coupled to the mobile device, an indication of the amount of the in-game purchase and the activation link for selection by the user for allowing an allocation of funds from the amount of the in-game purchase associated with the gaming application to one or more other accounts;
in response to detecting the selection of the activation link, displaying, via the graphical user interface coupled to the mobile device, a request for an authentication code, wherein the authentication code is a unique identifier associated with a timestamp of the in-game purchase and information identifying the mobile device of the user;
in response to receiving the authentication code, sending the authentication code to the remote computer server; and
upon receiving a notification that the authentication code is valid, displaying, via the graphical user interface coupled to the mobile device, a message indicating that a portion of the amount of the in-game purchase was allocated to the one or more other accounts.

15. The mobile device of claim 14, wherein the mobile device of the user is coupled to an online communication network.

16. The mobile device of claim 14, wherein the notification of the in-game purchase is received at the mobile device in real time or near real time with respect to the in-game purchase associated with the gaming application.

17. The mobile device of claim 14, wherein the one or more other accounts include financial accounts related to the user, one or more family members of the user, a co-player of the user, or a payee authorized by the user.

* * * * *